United States Patent
Ju et al.

(10) Patent No.: US 11,302,982 B2
(45) Date of Patent: Apr. 12, 2022

(54) BATTERY PACK AND METHOD OF MANUFACTURING THE SAME

(71) Applicant: LG Chem, Ltd., Seoul (KR)

(72) Inventors: Eunah Ju, Daejeon (KR); Sung Won Seo, Daejeon (KR); Heejun Jin, Daejeon (KR); Yoonkoo Lee, Daejeon (KR); Jeong Oh Moon, Daejeon (KR); Andreas Track, Sachsenheim (DE); Alexander Eichhorn, Sachsenheim (DE); Valentin Brokop, Sachsenheim (DE)

(73) Assignee: LG Energy Solution, Ltd.

( * ) Notice: Subject to any disclaimer, the term of this patent is extended or adjusted under 35 U.S.C. 154(b) by 188 days.

(21) Appl. No.: 16/618,993

(22) PCT Filed: Nov. 30, 2018

(86) PCT No.: PCT/KR2018/015113
§ 371 (c)(1),
(2) Date: Dec. 3, 2019

(87) PCT Pub. No.: WO2019/132276
PCT Pub. Date: Jul. 4, 2019

(65) Prior Publication Data
US 2020/0144570 A1    May 7, 2020

(30) Foreign Application Priority Data
Dec. 26, 2017  (KR) .......................... 10-2017-0180256

(51) Int. Cl.
*H01M 50/20*  (2021.01)

(52) U.S. Cl.
CPC ........ *H01M 50/20* (2021.01); *H01M 2220/20* (2013.01)

(58) Field of Classification Search
None
See application file for complete search history.

(56) References Cited

U.S. PATENT DOCUMENTS 9,450,219 B2   9/2016  Kim
9,499,068 B2   11/2016 Yang et al.
(Continued)

FOREIGN PATENT DOCUMENTS

CH    396368 A      7/1965
CN    205282543 U   6/2016
(Continued)

OTHER PUBLICATIONS

Extended European Search Report with Written Opinion for Application No. 18895603.1 dated Jun. 19, 2020, 6 pages.
(Continued)

*Primary Examiner* — Wyatt P McConnell
(74) *Attorney, Agent, or Firm* — Lerner, David, Littenberg, Krumholz & Mentlik, LLP

(57) ABSTRACT

A battery pack includes: a pack tray; a first x bar provided on the pack tray; a plurality of battery modules provided on the pack tray; a lateral plate for covering a lateral side of at least one of the battery modules; and a second x bar provided on the first x bar, overlapping the first x bar, and disposed in parallel to the first x bar, wherein the lateral plate forms a protrusions and depressions structure with at least one of the first x bar and the second x bar such that the lateral plate is combined with the at least one of the first x bar and the second x bar.

17 Claims, 13 Drawing Sheets

(56) References Cited

U.S. PATENT DOCUMENTS

| | | |
|---|---|---|
| 9,537,128 B2 | 1/2017 | Sekine |
| 9,570,721 B2 | 2/2017 | Kim |
| 2013/0071713 A1 | 3/2013 | Kim |
| 2014/0356662 A1 | 12/2014 | Yang et al. |
| 2014/0356664 A1 | 12/2014 | Jung |
| 2014/0356690 A1 | 12/2014 | Kim |
| 2015/0333304 A1 | 11/2015 | Sekine |
| 2018/0062224 A1 | 3/2018 | Drabon et al. |
| 2020/0212390 A1 | 7/2020 | Kume et al. |
| 2020/0295322 A1 | 9/2020 | Gunther |

FOREIGN PATENT DOCUMENTS

| | | |
|---|---|---|
| CN | 110313083 A | 10/2019 |
| JP | H07211303 A | 8/1995 |
| JP | H09240288 A | 9/1997 |
| JP | 2011034775 A | 2/2011 |
| JP | 2012101663 A | 5/2012 |
| JP | 2017021996 A | 1/2017 |
| KR | 20120058043 A | 6/2012 |
| KR | 20140140678 A | 12/2014 |
| KR | 20140140795 A | 12/2014 |
| KR | 20140144787 A | 12/2014 |
| KR | 20150016417 A | 2/2015 |
| KR | 101749191 B1 | 6/2017 |
| WO | 2014103007 A1 | 7/2014 |
| WO | 2016129473 A1 | 8/2016 |
| WO | 2019049760 A1 | 3/2019 |

OTHER PUBLICATIONS

Search Report for KR2018015113 dated Mar. 11, 2019.
Chinese Search Report for Application No. 201880042584.5 dated Nov. 23, 2021, 2 pages.

BATTERY PACK AND METHOD OF MANUFACTURING THE SAME

CROSS-REFERENCE TO RELATED APPLICATION

This application is a national phase entry under 35 U.S.C. § 371 of International Application No. PCT/KR2018/015113, filed Nov. 30, 2018, published in Korean, which claims priority to and the benefit of Korean Patent Application No. 10-2017-0180256 filed in the Korean Intellectual Property Office on Dec. 26, 2017, the entire contents of all of which are incorporated herein by reference.

TECHNICAL FIELD

The present invention relates to a battery pack and a manufacturing method thereof, and particularly, it relates to a battery pack including a fixing structure for mounting a battery module and a manufacturing method thereof.

BACKGROUND ART

As technical developments and demands on mobile devices increase, demands on rechargeable batteries as energy sources are steeply increasing. Accordingly, studies on the rechargeable batteries for satisfying various demands are in active progress.

The rechargeable batteries are gaining much attention as energy sources for power-based devices such as electric bicycles, electric vehicles, and hybrid electric vehicles in addition to mobile devices such as mobile phones, digital cameras, and laptops.

Small battery packs to which a single battery cell is packed are used in small devices such as cellular phones and cameras, and mid-sized or large battery packs to which a battery module or a battery pack having two or more battery cells connected in parallel and/or in series are packed are used in mid-sized/large devices such as laptops and electric vehicles.

When a battery pack is configured by connecting a plurality of battery cells, in a general way, a battery module including a plurality of battery cells is configured, a battery module assembly including a plurality of battery modules is configured, and the battery pack is configured by adding other constituent elements to the battery module assembly. Therefore, when the battery pack is configured, electrical connection and mechanical connection among a plurality of battery modules may determine a shape of a battery module assembly.

FIG. 1 shows a battery pack structure according to prior art. Referring to FIG. 1, rigidity of the battery pack structure may be improved by arranging a plurality of battery modules 110 on a pack tray 100, mounting the same on the pack tray 100 through a mounting bolt 130, and forming an impact absorbing column 120 between the neighboring battery modules 110. However, an additional space for the mounting bolt 130 is needed, and there is a limit in improving energy density of the battery pack because of a space occupied by the impact absorbing column 120.

DISCLOSURE

Technical Problem

The present invention has been made in an effort to provide a battery pack for reinforcing rigidity of a battery pack without an additional space for mounting and fixing a battery module, and a manufacturing method thereof.

Technical Solution

However, tasks to be solved by exemplary embodiments of the present invention may not be limited to the above-described task and may be extended in various ways within a range of technical scopes included in the present invention.

An exemplary embodiment of the present invention provides a battery pack including: a pack tray; a first x bar provided on the pack tray; a plurality of battery modules provided on the pack tray; a lateral plate for covering a lateral side of at least one of the battery modules; and a second x bar provided on the first x bar, overlapping the first x bar, and disposed in parallel to the first x bar, wherein the lateral plate forms a protrusions and depressions structure with at least one of the first x bar and the second x bar such that the lateral plate is combined with the at least one of the first x bar and the second x bar.

The first x bar and the second x bar may be combined by a plurality of fastening members.

Each of the fastening members may be formed of a bolt fastening structure.

The bolt fastening structure may include a bolt penetrating the second x bar and passing through at least part of the first x bar.

The protrusions and depressions structure may include a protrusion formed on at least one of respective edges of an end of the lateral plate and a recess portion formed on at least one of the first x bar and the second x bar.

The battery pack may further include a second lateral plate for covering a lateral side of at least another one of the battery modules, and the protrusions and depressions structure may include a plurality of protrusions and depressions, and the plurality of protrusions and depressions may include first protrusions and depressions and second protrusions and depressions formed by recess portions formed on respective sides of the first x bar and protrusions formed at bottoms of ends of the lateral plates neighboring each other with the first x bar therebetween, and third protrusions and depressions and fourth protrusions and depressions formed by recess portions formed on respective sides of the second x bar and protrusions formed on tops of ends of the lateral plates neighboring each other.

The protrusions and depressions structure may include a recess portion formed on at least one of respective edges of an end of the lateral plate and a protrusion formed on at least one of the first x bar and the second x bar.

The first x bar may have a "⊥" shape, and the second x bar may have a "⊤" shape.

The first x bar and the second x bar may be provided between battery modules neighboring each other from among the plurality of battery modules.

Each of the battery modules may be rectangular with longer sides and shorter sides, and the first x bar and the second x bar may be disposed to correspond to the shorter side of the battery module.

Another exemplary embodiment of the present invention provides a device including the above-described battery pack.

Another exemplary embodiment of the present invention provides a method for manufacturing a battery pack including a plurality of battery modules, including: attaching a "⊥" shaped first x bar to a pack tray; combining a plurality of lateral plates for partitioning a space in which the plurality of battery modules are disposed and the first x bar by a protrusions and depressions structure; disposing a "⊤" shaped second x bar to the first x bar; and disposing the plurality of battery modules among the plurality of lateral plates.

The second x bar may be disposed to overlap the first x bar and may extend in parallel to the first x bar.

The method may further include combining the first x bar and the second x bar by a plurality of bolt fastening structures.

The protrusions and depressions structure may be formed to include a protrusion formed on at least one of respective edges of an end of the lateral plate and a recess portion formed on at least one of the first x bar and the second x bar.

The protrusions and depressions structure may be formed to include a recess portion formed on at least one of respective edges of an end of the lateral plate and a protrusion formed on at least one of the first x bar and the second x bar.

Advantageous Effects

According to the exemplary embodiments, the lateral plate of the battery module is assembled to the x bar (X-bar) of the battery pack, so that the battery module may be mounted on the battery pack and the lateral plate may function as an impact absorbing column of the battery pack.

The x bar of the battery pack is separated into two pieces to thus reinforce rigidity of the battery pack and simultaneously fix the battery module.

There is no need to provide an additional space for mounting a battery module, thereby improving energy density of the battery pack.

MODE FOR INVENTION

Figure 1:
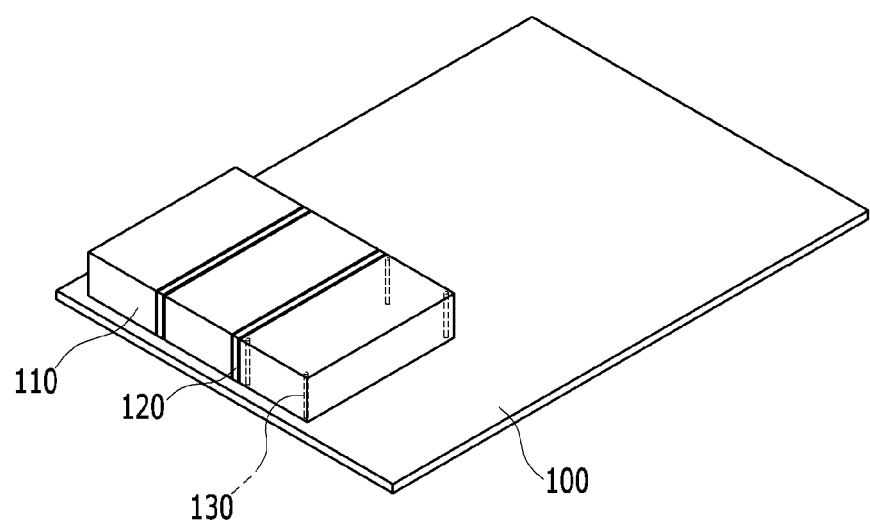
FIG. 1 shows a battery pack structure according to prior art.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

The size and thickness of each configuration shown in the drawings are arbitrarily shown for better understanding and ease of description, and the present invention is not limited thereto. The thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

Figure 2:
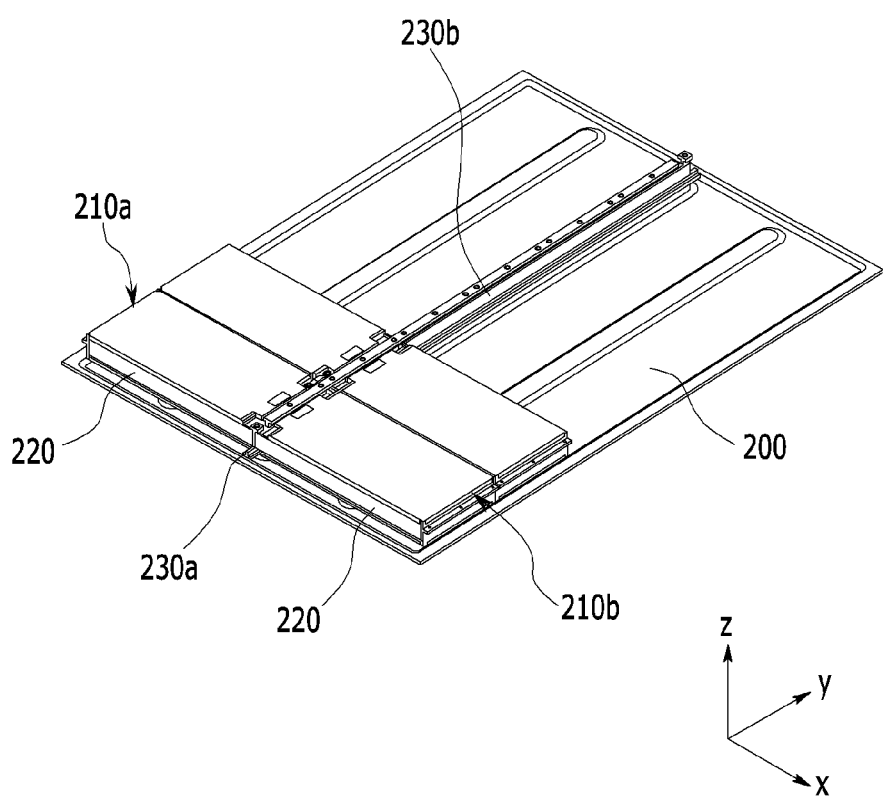
FIG. 2 shows a perspective view of a battery pack according to an exemplary embodiment of the present invention.

FIG. 2 shows a perspective view of a battery pack according to an exemplary embodiment of the present invention.

Referring to FIG. 2, the battery pack according to an exemplary embodiment of the present invention includes a plurality of battery modules 210a and 210b provided on a pack tray 200. Four battery modules 210a and 210b are shown in FIG. 2, and regarding the battery pack according to the present exemplary embodiment, six battery modules 210a and 210b may be respectively disposed in two rows in a y direction on the pack tray 200. In FIG. 2, a plurality of battery modules 210a and 210b have a structure in which six of them are arranged in two rows, and the structure of the two rows and six columns is modifiable according to required capacity and a target structure in which the battery pack is mounted. Although not shown, the battery module includes at least two battery cells.

In FIG. 2, a first x bar 230a and a second x bar 230b are disposed between the battery modules 210a and 210b of the respective rows, and a plurality of lateral plates 220 cover lateral sides of the battery modules 210a and 210b. In this instance, the plurality of lateral plates 220 may be separated with respect to the first x bar 230a and the second x bar 230b.

Figure 3:
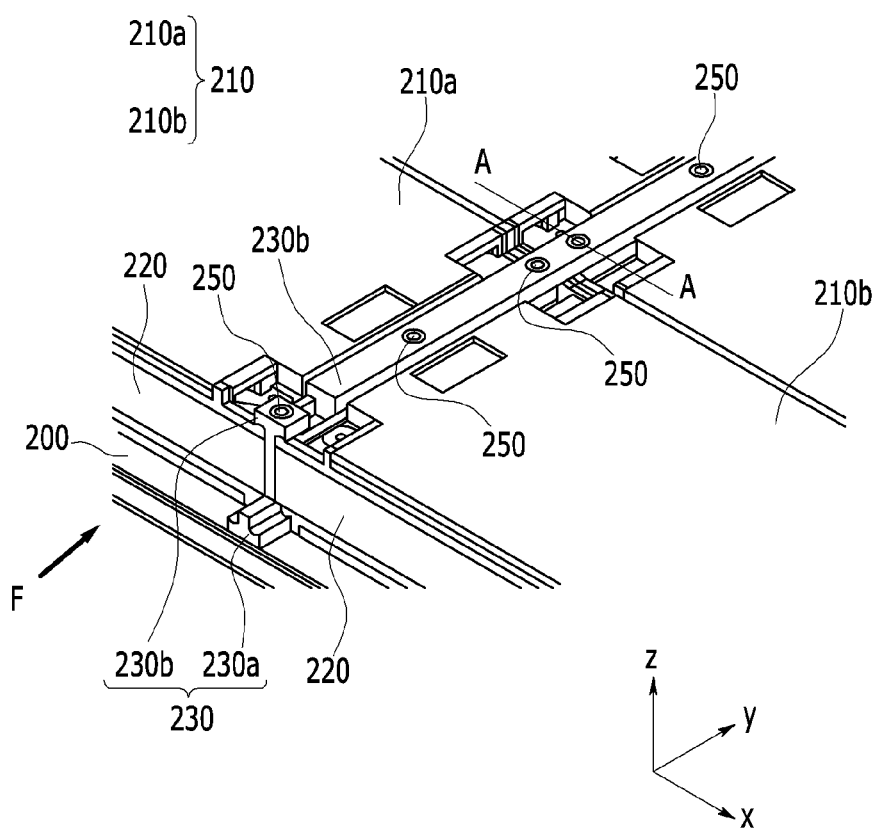
FIG. 3 shows a partial perspective view of showing part of a battery pack shown in FIG. 2.
Figure 4:
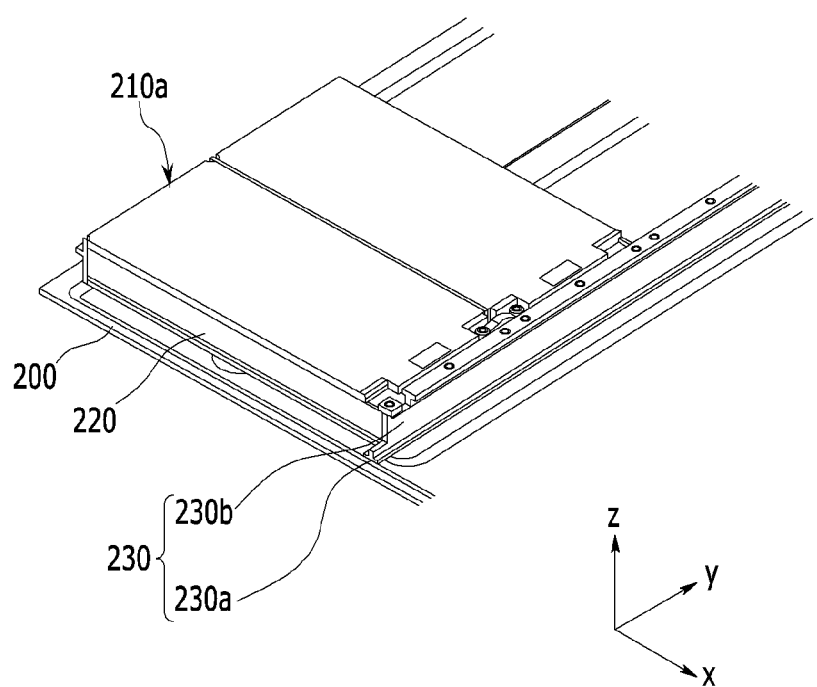
FIG. 4 shows an exploded view of a battery pack of FIG. 2 from which one row of battery modules are removed.

FIG. 3 shows a partial perspective view of part of a battery pack shown in FIG. 2. FIG. 4 shows an exploded view of a battery pack of FIG. 2 from which one row of battery modules are removed.

Referring to FIG. 3 and FIG. 4, a lateral side of the battery module 210 according to the present exemplary embodiment is covered with a plurality of lateral plates 220. This will be described in detail later in a description of a method for manufacturing a battery pack.

FIG. 3 shows a part of a boundary region where battery modules 210a and 210b neighboring each other from among a plurality of battery modules meet. In FIG. 2, an x bar 230 including a first x bar 230a and a second x bar 230b is provided between the first battery module 210a and the second battery module 210b neighboring each other. Referring to FIG. 3 and FIG. 4, the first x bar 230a lengthily extends in the y-axis direction, and the second x bar 230b is disposed on the first x bar 230a and extends to overlap the first x bar 230a and in parallel to the same. That is, the first x bar 230a and the second x bar 230b overlap each other in the z-axis direction, and they may have a bar shape lengthily extending in the y-axis direction. The first x bar 230a may have a "⊥" shape, and the second x bar 230b may have a "⊤" shape.

The first x bar 230a and the second x bar 230b are combined by a plurality of fastening members 250. The fastening member 250 may be configured by a bolt fastening structure.

The lateral plate 220 forms a concave and convex structure with the "⊥" shaped first x bar 230a and/or the "⊤" shaped second x bar 230b, and the lateral plate 220 is assembled to the first x bar 230a and/or the second x bar 230b through the structure. Therefore, through the structure of mounting the battery module on the battery pack, the lateral plate 220 may function as a plurality of impact absorbing columns previously formed to improve rigidity of the battery pack structure.

Figure 5:
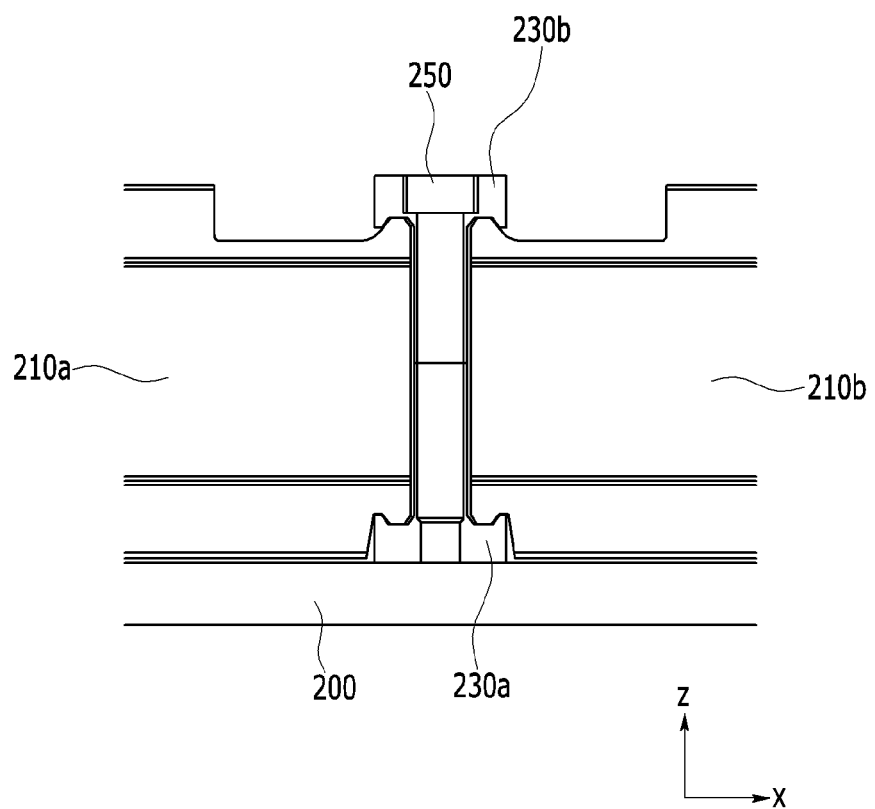
FIG. 5 shows a cross-sectional view with respect to a line A-A of FIG. 3.

FIG. 5 shows a cross-sectional view with respect to a line A-A of FIG. 3. Referring to FIG. 5, the fastening member 250 may include a bolt penetrating through the second x bar 230b and passing through at least part of the first x bar 230a.

Figure 6:
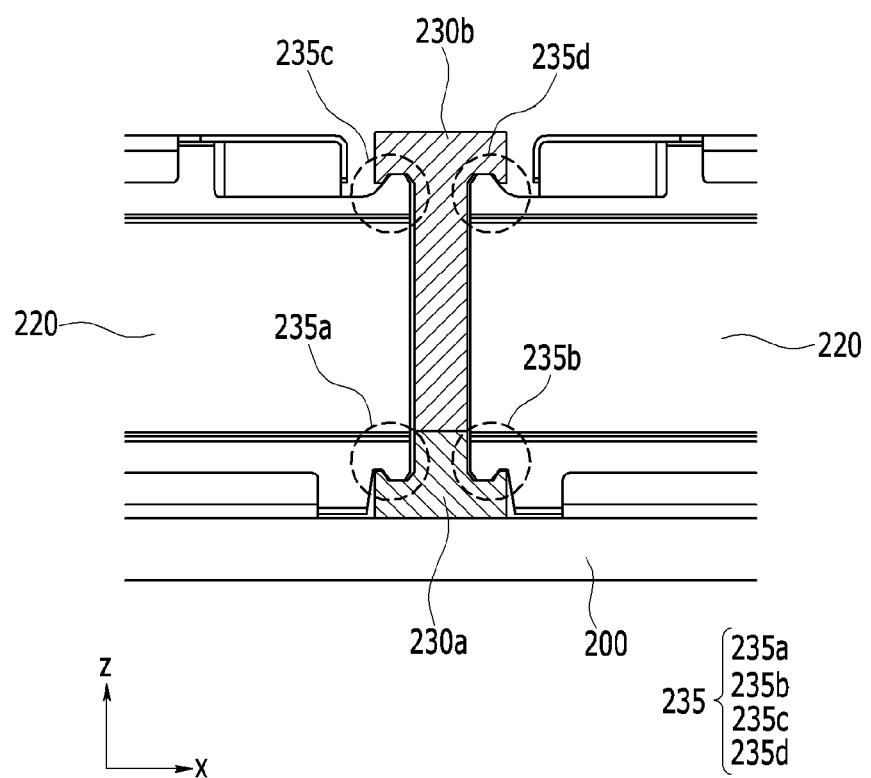
FIG. 6 shows a front view seen in an F direction of FIG. 3.
Figure 7:
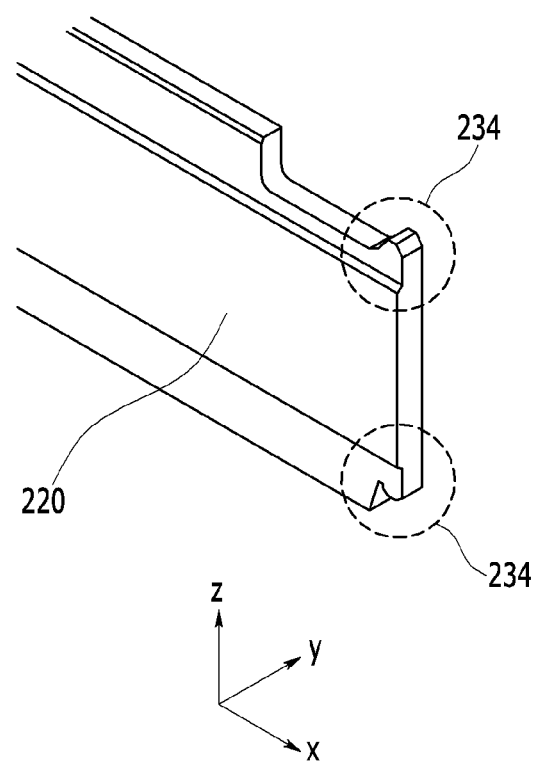
FIG. 7 shows a partial perspective view of a lateral plate of a battery pack according to an exemplary embodiment of the present invention.

FIG. 6 shows a front view seen in an F direction of FIG. 3. FIG. 7 shows a partial perspective view of a lateral plate of a battery pack according to an exemplary embodiment of the present invention.

Referring to FIG. 6, a ring-shaped protrusion is formed on at least one of respective edges of an end of the lateral plate 220 so as to be combined to respective sides of the first x bar 230a and respective sides of the second x bar 230b. In detail, respective edges of an end of the lateral plate 220 and the first x bar 230a form protrusions and depressions 235a and 235b, and respective edges of an end of the lateral plate 220 and the second x bar 230b form protrusions and depressions 235c and 235d.

At least one of the protrusions and depressions 235 may be formed on a portion where the end of the lateral plate 220 meets the first x bar 230a and/or a portion where the end of the lateral plate 220 meets the second x bar 230b. In detail, FIG. 6 shows a plurality of protrusions and depressions 235 including first protrusions and depressions 235a and second protrusions and depressions 235b formed by protrusions respectively formed on bottoms of ends of two lateral plates 220 neighboring each other with recess portions formed on respective sides of the first x bar 230a and the first x bar 230a, and third protrusions and depressions 235c and fourth protrusions and depressions 235d formed by protrusions respectively formed on recess portions respectively formed on respective sides of the second x bar 230b and tops of ends of two lateral plates 220 neighboring each other.

The protrusions and depressions 235 function to mount the battery module on the battery pack by assembling of the lateral plate 220 and the first x bar 230a and/or the second x bar 230b, and it is preferable, as shown in FIG. 6, to form a total of four protrusions and depressions 235 or at least four protrusions and depressions 235 on a portion in which respective edges of ends of the lateral plate 220 meet the first x bar 230a and the second x bar 230b so as to improve fixation. However, when the needed fixation may be obtained by the protrusions and depressions formed between one of the first x bar 230a and the second x bar 230b and the lateral plate 220, a protrusions and depressions structure may be formed between one of the first x bar 230a and the second x bar 230b and the lateral plate 220 and it may not be formed between the other thereof and the lateral plate 220 as a modified example.

Figure 8:
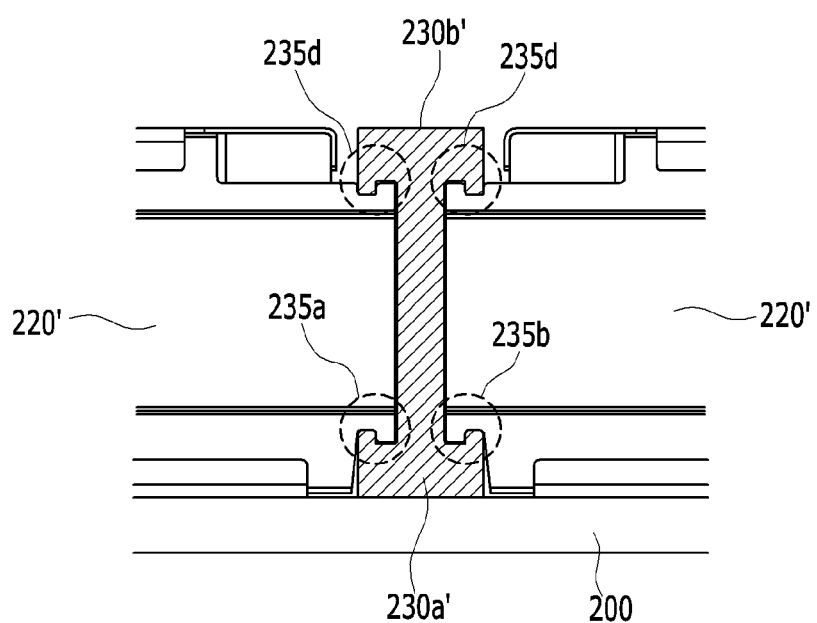
FIG. 8 shows a front view of a protrusions and depressions structure according to an exemplary variation of FIG. 6.

Regarding the structure of the lateral plate 220 with reference to FIG. 7, a rightmost portion corresponds to an end of the lateral plate 220, and protrusions 234 are respectively formed on respective edges of ends of the lateral plate 220. The protrusion 234 combines with the recess portions formed on the left side and the right side of the first x bar 230a and the second x bar 230b shown in FIG. 6 to form the protrusions and depressions 235. As an exemplary variation of the structure of the protrusions and depressions 235, referring to FIG. 8, recess portions are respectively formed on respective edges of ends of a lateral plate 220', and protrusions combined thereto may be formed on the left side and the right side of a first x bar 230a' and a second x bar 230b'.

The above-described battery pack may be applied to various devices. The devices are applicable to transportation means such as electric bicycles, electric vehicles, or hybrid vehicles, and without being limited thereto, they may be applied to various devices using a battery pack.

A method for manufacturing the above-described battery pack according to an exemplary embodiment of the present invention will now be described with reference to FIG. 9 through FIG. 13.

FIG. 9 through FIG. 13 show perspective views of a method for manufacturing a battery pack according to an exemplary embodiment of the present invention.

Figure 9:
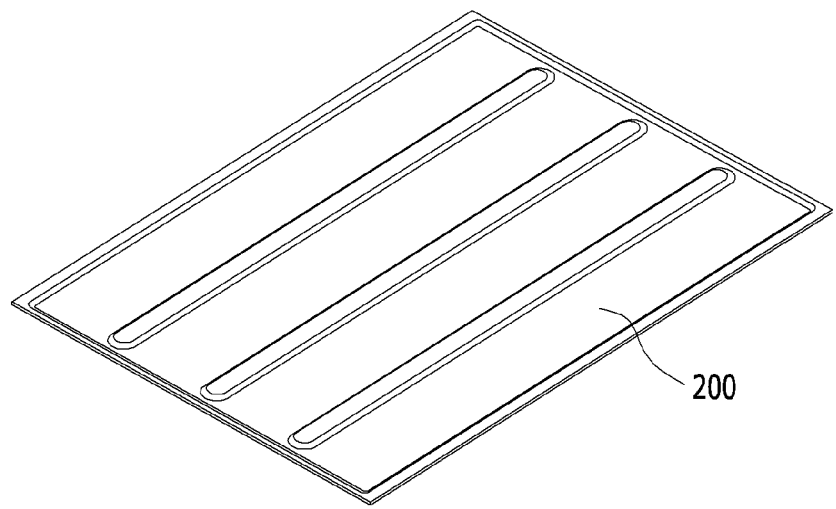
FIG. 9 through FIG. 13 show perspective views of a method for manufacturing a battery pack according to an exemplary embodiment of the present invention.
Figure 10:
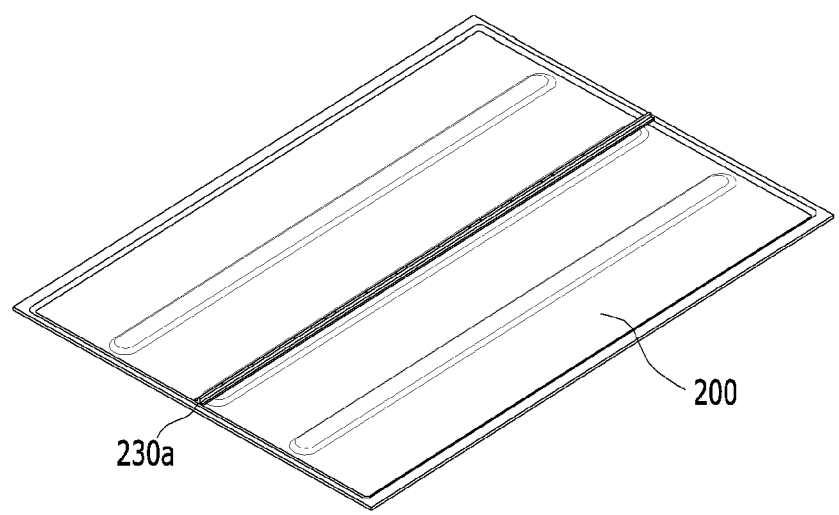

Referring to FIG. 9 and FIG. 10, a "⊥" shaped first x bar 230a is attached to the pack tray 200. The first x bar 230a may be attached to the pack tray 200 by welding. As shown in FIG. 10, a plurality of openings are formed in the first x bar 230a.

Figure 11:
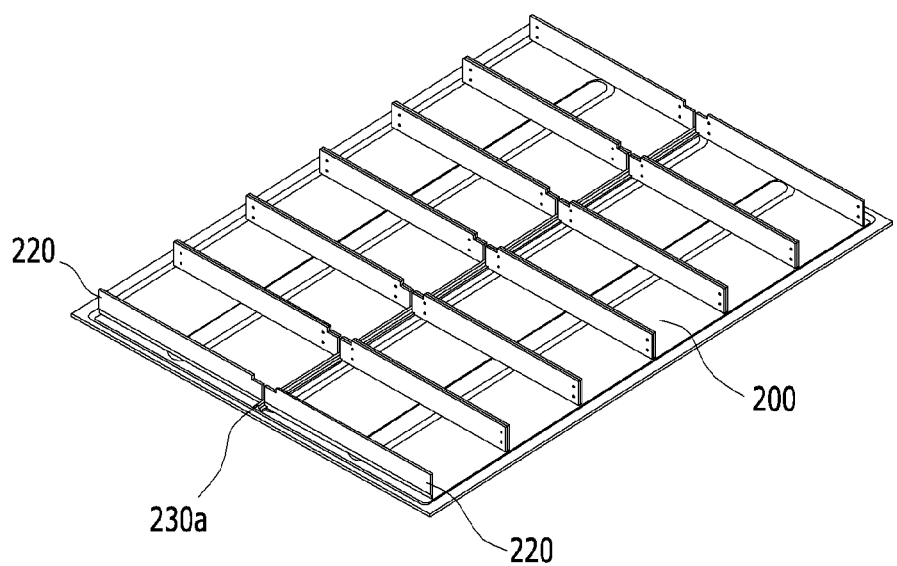

Referring to FIG. 11, a plurality of lateral plates 220 are disposed on the pack tray 200 to partition a space in which a plurality of battery modules are disposed, and in this instance, a ring shape at the bottom of the end of the lateral plate 220 may be hooked in the recess portion of the first x bar 230a. FIG. 6 may be referenced in connection with this.

Figure 12:
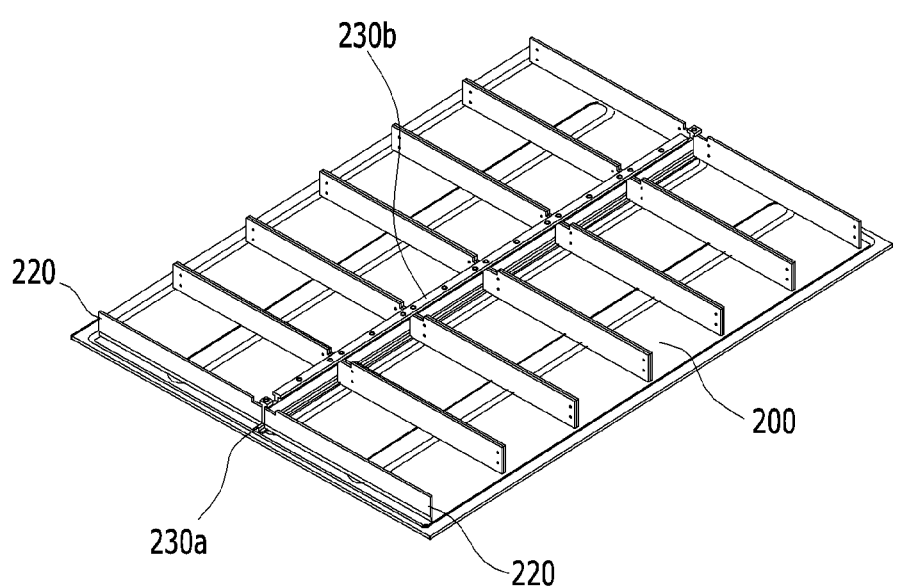

Referring to FIG. 12, a "⊤" shaped second x bar 230b is disposed on the first x bar 230a. In this instance, the recess portion of the second x bar 230b may be hooked on a ring shape at the top of the ends of the lateral plate 220. The second x bar 230b may overlap the first x bar 230a and may extend in parallel. FIG. 6 may be referenced in connection with this.

Figure 13:
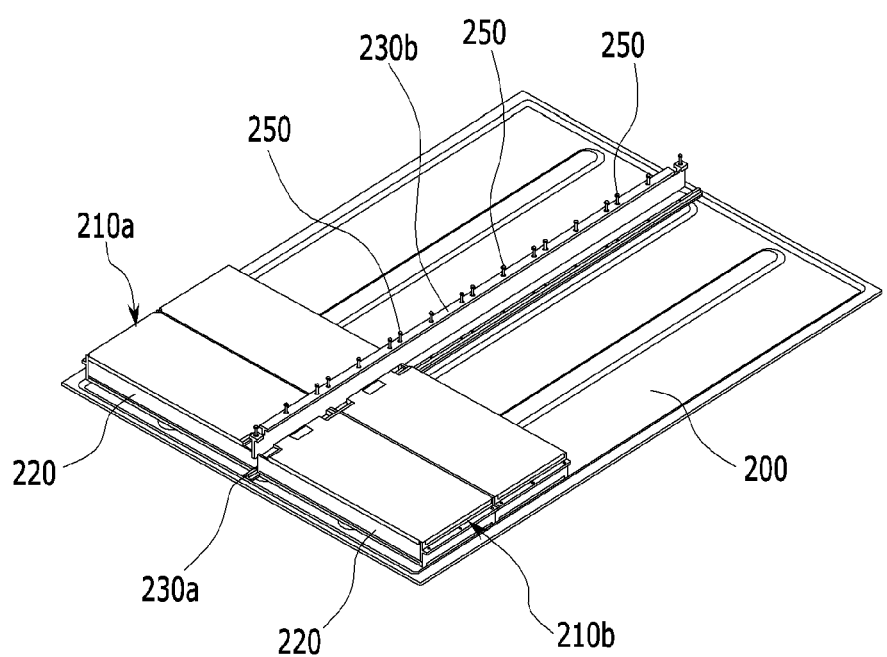

Referring to FIG. 13, a plurality of battery modules 210a and 210b are disposed among a plurality of lateral plates 220, and the first x bar 230a and the second x bar 230b are combined by the fastening member 250. The fastening member 250 may be a plurality of bolt fastening structures.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

200: pack tray
210, 210a, 210b: battery module
220: lateral plate
230: first x bar
240: second x bar
250: fastening member

The invention claimed is:

1. A battery pack comprising:
    a pack tray;
    a first x bar provided on the pack tray;
    a plurality of battery modules provided on the pack tray;
    a lateral plate for covering a lateral side of at least one of the battery modules; and
    a second x bar provided on the first x bar, overlapping the first x bar, and disposed in parallel to the first x bar,
    wherein the lateral plate forms a protrusions and depressions structure with at least one of the first x bar and the second x bar such that the lateral plate is combined with the at least one of the first x bar and the second x bar.

2. The battery pack of claim 1, wherein
    the first x bar and the second x bar are combined by a plurality of fastening members.

3. The battery pack of claim 2, wherein
    each of the plurality of fastening members is formed of a bolt fastening structure.

4. The battery pack of claim 3, wherein
    the bolt fastening structure includes a bolt penetrating the second x bar and passing through at least part of the first x bar.

5. The battery pack of claim 1, wherein
    the protrusions and depressions structure includes a protrusion formed on at least one of respective edges of an end of the lateral plate and a recess portion formed on at least one of the first x bar and the second x bar.

6. The battery pack of claim 1, further comprising a second lateral plate for covering a lateral side of at least another one of the battery modules, wherein
    the protrusions and depressions structure includes a plurality of protrusions and depressions, and
    the plurality of protrusions and depressions include
    first protrusions and depressions and second protrusions and depressions formed by recess portions formed on respective sides of the first x bar and protrusions formed at bottoms of ends of the lateral plates neighboring each other with the first x bar therebetween, and
    third protrusions and depressions and fourth protrusions and depressions formed by recess portions formed on respective sides of the second x bar and protrusions formed on tops of ends of the lateral plates neighboring each other.

7. The battery pack of claim 1, wherein
    the protrusions and depressions structure includes a recess portion formed on at least one of respective edges of an end of the lateral plate and a protrusion formed on at least one of the first x bar and the second x bar.

8. The battery pack of claim 1, wherein
    both of the first and second x bars have a shape in which a main wall extends perpendicularly from a central portion of an end wall.

9. The battery pack of claim 1, wherein
    the first x bar and the second x bar are provided between battery modules neighboring each other from among the plurality of battery modules.

10. The battery pack of claim 9, wherein
    each of the battery modules is rectangular with longer sides and shorter sides, and the first x bar and the second x bar are disposed to correspond to the shorter side of the battery module.

11. A device including the battery pack of claim 1.

12. A method for manufacturing a battery pack including a plurality of battery modules, comprising:
    attaching a first x bar to a pack tray;
    combining a plurality of lateral plates for partitioning a space in which the plurality of battery modules are disposed and the first x bar by a protrusions and depressions structure;
    disposing a second x bar to the first x bar; and
    disposing the plurality of battery modules among the plurality of lateral plates.

13. The method of claim 12, wherein
    the second x bar is disposed to overlap the first x bar and to extend in parallel to the first x bar.

14. The method of claim 12, further comprising:
    combining the first x bar and the second x bar by a plurality of bolt fastening structures.

15. The method of claim 12, wherein
    the protrusions and depressions structure is formed to include a protrusion formed on at least one of respective edges of an end of the lateral plate and a recess portion formed on at least one of the first x bar and the second x bar.

16. The method of claim 12, wherein
    the protrusions and depressions structure is formed to include a recess portion formed on at least one of respective edges of an end of the lateral plate and a protrusion formed on at least one of the first x bar and the second x bar.

17. The method of claim 12, wherein
    both of the first and second x bars have a shape in which a main wall extends perpendicularly from a central portion of an end wall.

* * * * *